US006950744B2

(12) United States Patent
Daizen (10) Patent No.: US 6,950,744 B2
(45) Date of Patent: Sep. 27, 2005

(54) INTERSECTION SEARCH APPARATUS AND INTERSECTION SEARCH METHOD THEREFOR

(75) Inventor: Yasuhiro Daizen, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/151,097

(22) Filed: May 21, 2002

(65) Prior Publication Data
US 2004/0201501 A1 Oct. 14, 2004

(30) Foreign Application Priority Data
Dec. 10, 2001 (JP) ........................................ 2001-376150

(51) Int. Cl.⁷ ..................... G01C 21/00; G06F 165/00; G08G 1/123
(52) U.S. Cl. .................. 701/209; 701/210; 340/988
(58) Field of Search ............................... 701/209, 210, 701/25, 26, 207, 208, 211; 340/995.21, 990, 905, 995.13, 988, 995.19, 995.2; 73/178 R (56) References Cited

U.S. PATENT DOCUMENTS

| | | | |
|---|---|---|---|
| 5,043,902 A | * 8/1991 | Yokoyama et al. | 364/449 |
| 5,191,532 A | 3/1993 | Moroto et al. | 364/449 |
| 5,293,163 A | * 3/1994 | Kakihara et al. | 340/995 |
| 5,680,312 A | 10/1997 | Oshizawa et al. | 364/444.2 |
| 5,774,073 A | * 6/1998 | Maekawa et al. | 340/995 |
| 5,893,898 A | * 4/1999 | Tanimoto | 701/201 |
| 6,088,649 A | * 7/2000 | Kadaba et al. | 701/201 |
| 6,119,066 A | * 9/2000 | Sugiura et al. | 701/208 |
| 6,178,377 B1 | * 1/2001 | Ishihara et al. | 701/200 |
| 6,212,472 B1 | * 4/2001 | Nonaka et al. | 701/208 |
| 6,249,740 B1 | * 6/2001 | Ito et al. | 701/200 |
| 6,278,940 B1 | 8/2001 | Endo | 701/209 |
| 6,282,489 B1 | 8/2001 | Bellesfield et al. | 701/201 |
| 6,282,492 B1 | * 8/2001 | Gorai et al. | 701/209 |
| 6,333,702 B1 | * 12/2001 | Hiyokawa et al. | 340/995.21 |
| 6,360,168 B1 | * 3/2002 | Shimabara | 701/211 |

FOREIGN PATENT DOCUMENTS

| | | |
|---|---|---|
| JP | 9-133541 A | 5/1997 |
| JP | 2812294 B2 | 8/1998 |

OTHER PUBLICATIONS

German Office Action, Jul. 16, 2003 for 102 34 563.5–52.

* cited by examiner

*Primary Examiner*—Thomas G. Black
*Assistant Examiner*—Dalena Tran
(74) *Attorney, Agent, or Firm*—Birch, Stewart, Kolasch & Birch, LLP (57) ABSTRACT

An intersection search apparatus includes: a map information retrieve unit to retrieve map information; an input unit to specify a road to be searched and/or intersection-related information on a facility and/or a featuring object from roads included in the map information; an intersection search unit to search an intersection which exists on the road to be searched and specified by the input unit and to which the facility and/or the featuring object of the specified intersection-related information are adjacent from the map; and an output unit to output the intersection information related to the intersection search by the intersection search unit.

11 Claims, 7 Drawing Sheets

GENRE SELECTION SCREEN

FIG.5

FACILITY SELECTION SCREEN

FIG.6

SEARCH CONTENT DISPLAY SCREEN

FIG.7

CONDITION SELECTION SCREEN

LIST DISPLAY SCREEN

FIG.10

INTERSECTION SEARCH APPARATUS AND INTERSECTION SEARCH METHOD THEREFOR

BACKGROUND OF THE INVENTION

1. Field of the Invention

The present invention relates to an intersection search apparatus capable of easily searching an intersection and an intersection search method therefor.

2. Description of the Related Art

For example, a navigation apparatus for giving a movable body a route guide to a destination has an intersection search as one method to search the destination. In this intersection search in the prior art, the names of roads which cross a road specified by a user to be searched, are displayed in a list. Then, the user selects the name of a road crossing the road to be searched at a viewpoint from the intersection of the road that the user wants to search from the names of roads displayed in the list and specifies the intersection that the user wants to search.

According to the prior art, the intersection search is performed in this manner, so there is presented a problem that if the user can not set the name of a road crossing a road to be searched, the user can not set the name of a road crossing the road to be searched, the user can not specify any intersection of the road which the user want to search and that if the user does not know the name of the road crossing the road to be searched, the user can not achieve the objective search.

SUMMARY OF THE INVENTION

The present invention has been made to solve the above mentioned problem. It is the object of the present invention to provide an intersection search apparatus capable of easily searching an intersection and an intersection search method therefor.

An intersection search apparatus in accordance with the present invention has: a map information retrieve unit to retrieve map information; an input unit to specify a road to be searched and/or intersection related information on a facility and/or a featuring object from roads included in the map information; an intersection search unit to search an intersection which exists on said road to be searched and specified by said input unit and to which said facility and/or said featuring object of said specified intersection related information are adjacent; and an output unit for output the intersection information related to said intersection searched by said intersection search unit. Therefore, there is produced an effect that even if the user can not set the name of the road crossing the road to be specified and the name of an intersection because the user does not know them, the user can easily search the objective intersection by specifying a combination of a plurality of facilities and/or featuring objects.

In the intersection search apparatus in accordance with the present invention, the output unit outputs the intersection information selected from the intersection information displayed in a list. Therefore, there is produced an effect that the user can specify the objective intersection on the map screen.

In the intersection search apparatus in accordance with the present invention, the output unit emphatically displays said selected intersection and the specified facility or featuring object on a map by means that said selected intersection and the specified facility or featuring object adjacent to said selected intersection are displayed with their symbols different in color or shape or flickered. Therefore, there is produced an effect that the user can easily specify the objective intersection by the symbol which is changed in color or shape or flickered on the map screen.

An intersection search method in accordance with the present invention has: a map information retrieve step to retrieve map information; an input step to specify a road to be searched and/or intersection-related information on a facility and/or a featuring object from roads included in said map information; an intersection searching step to search an intersection which exists on said road to be searched and specified by said input step and to which the facility and/or the featuring object of said specified intersection-related information are adjacent from said map information; and an output step to output said intersection information related to said intersection searched by said intersection searching step. Therefore, there is produced an effect that even if the user can not set the name of the road crossing the road to be specified and the name of the intersection because the user does not know them, the user can easily search the objective intersection.

DESCRIPTION OF THE PREFERRED EMBODIMENT

Embodiment 1

Figure 1:
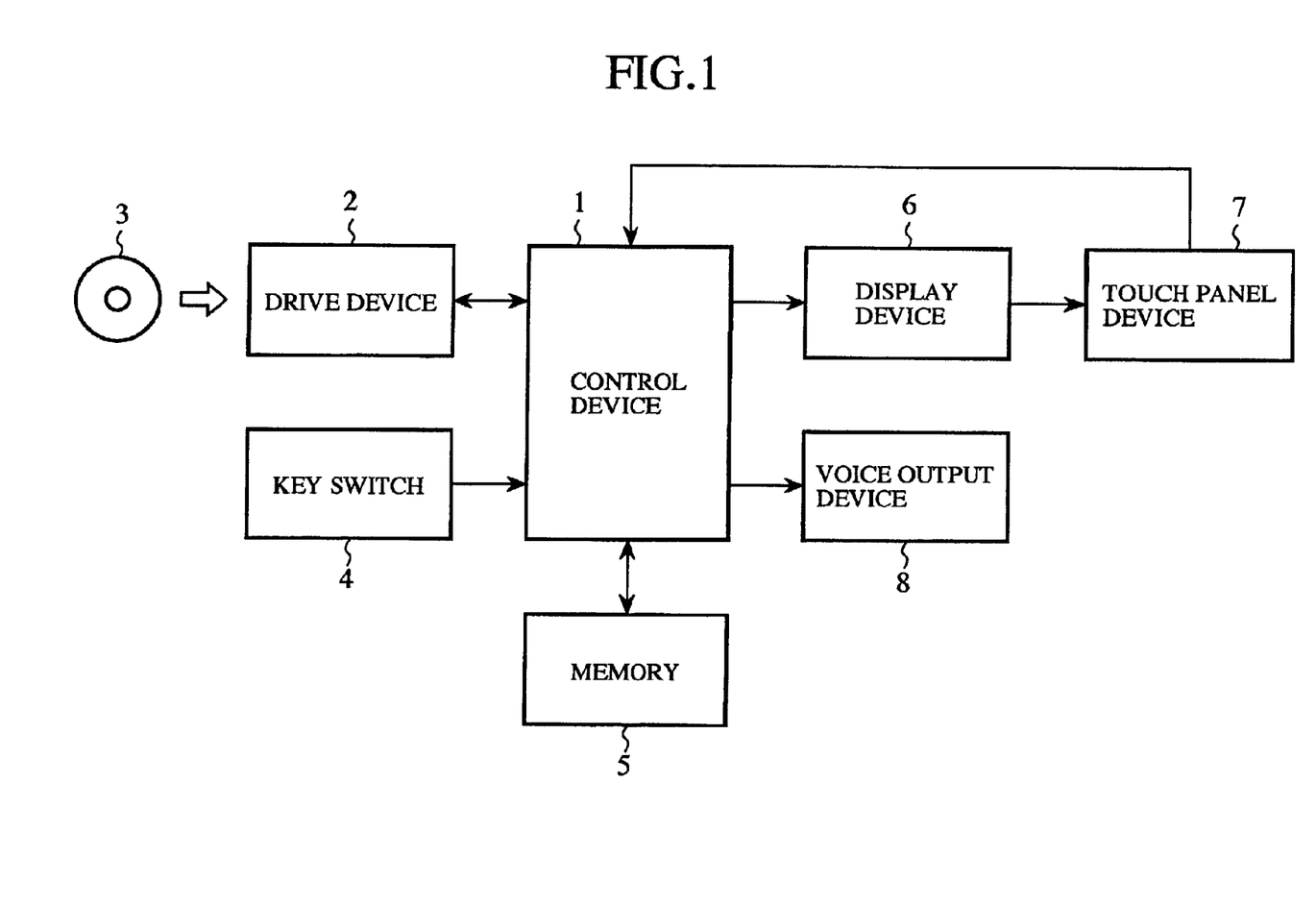
FIG. 1 is a block diagram to show the configuration of an intersection search apparatus for realizing an intersection search method of an embodiment 1 in accordance with the present invention.

FIG. 1 is a block diagram to show the configuration of an intersection search apparatus for realizing an intersection search method of an embodiment 1 in accordance with the present invention. Incidentally, in the following description, a case where this intersection search apparatus is used as a navigation apparatus mounted on a vehicle will be described as an example. In FIG. 1, a reference numeral 1 denotes a control device constituted by a computer and for controlling various devices; a reference numeral 2 denotes a drive device for reading map information stored in a recording medium 3, for example, a CD-ROM being used as the recording medium 3; a reference numeral 4 denotes key switches including an ignition key switch of a vehicle and operation switches for performing various kinds of settings for performing a route guide and an intersection search which include the specification of a road to be searched and/or intersection-related information on facilities and/or featuring objects from roads included in the above mentioned map information; a reference numeral 5 denotes a memory for storing the map information read from the recording medium 3 and various kinds of data for displaying various kinds of operation screens necessary for performing the intersection search; a reference numeral 6 denotes, for example, a liquid crystal display type display device; a reference numeral 7 denotes a touch panel device which is arranged on the display screen of the display device 6; and a reference numeral 8 denotes a voice output device for announcing when the intersection search and the route guide are performed.

Figure 2:
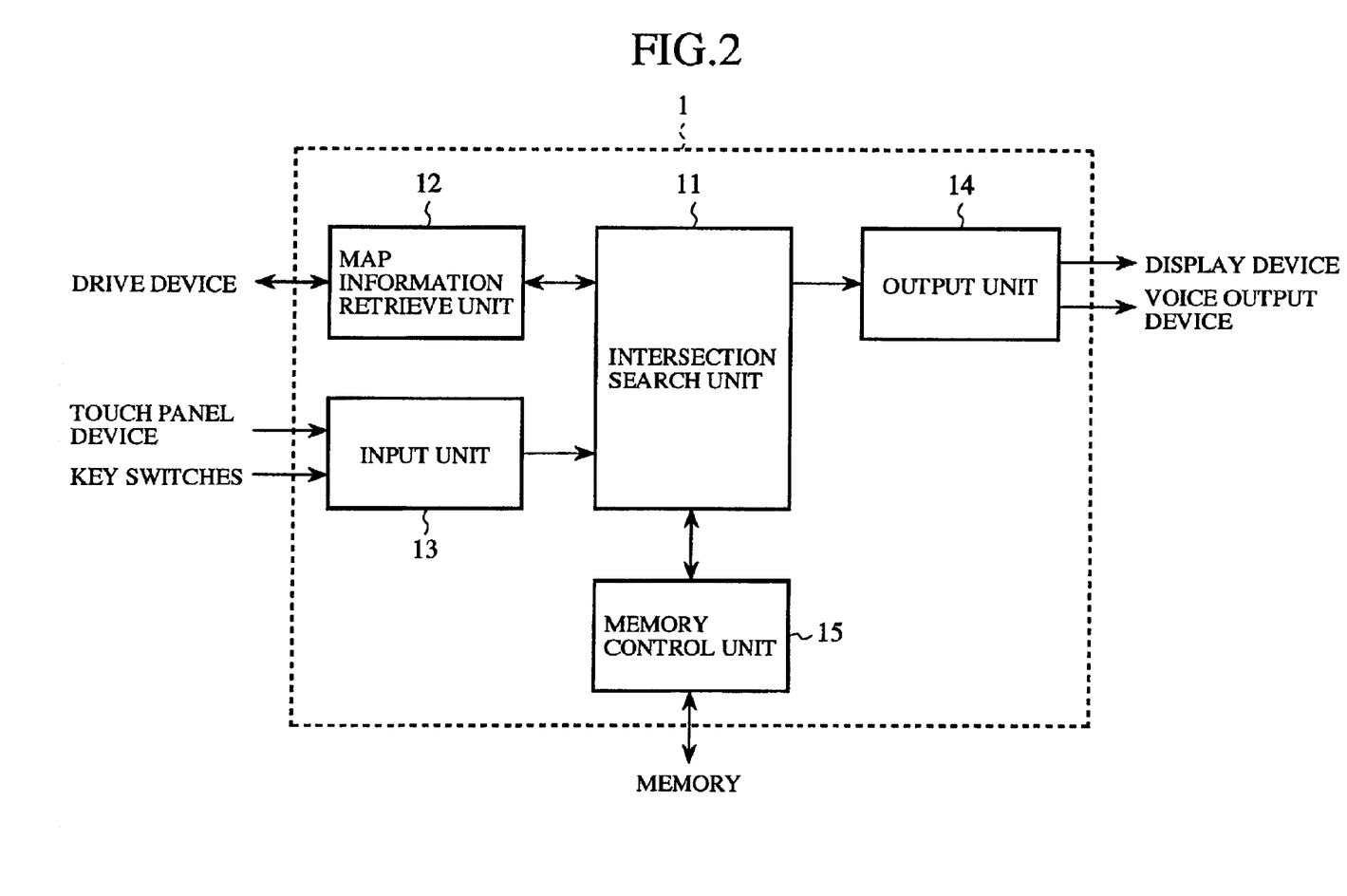
FIG. 2 is a functional block diagram to show a control device for realizing the function of the intersection search apparatus of the embodiment 1 in accordance with the present invention.

FIG. 2 is a functional block diagram to show the control device 1 for realizing the function of this intersection search apparatus shown by blocks for the respective functions. In FIG. 2, a reference numeral 11 denotes an intersection search unit to search an intersection by the intersection search method of the embodiment 1 in accordance with the present invention; a reference numeral 12 denotes a map information retrieve unit for reading the map information from the recording medium 3 via the drive device 2; a reference numeral 13 denotes an input unit including an input/output interface of the touch panel device 7 for getting a signal responsive to a position where a touch operation is performed and an I/O port for getting the ON/OFF signal of the key switches 4 to specify the road to be searched and the intersection-related information on the facilities and/or the featuring objects from the roads included in the map information; a reference numeral 14 denotes an output unit including a display interface for output various kinds of data displaying various kinds of operation screens necessary for performing the intersection search to the display device 6 and a voice output interface for output a voice signal announcing when the intersection search and the route guide are performed to the voice output device 8; and a reference numeral 15 denotes a memory control unit for storing various kinds of data such as the map information and the like read from the recording medium 3 into the memory 5 and reading various kinds of data from the memory 5 when required.

Figure 3:
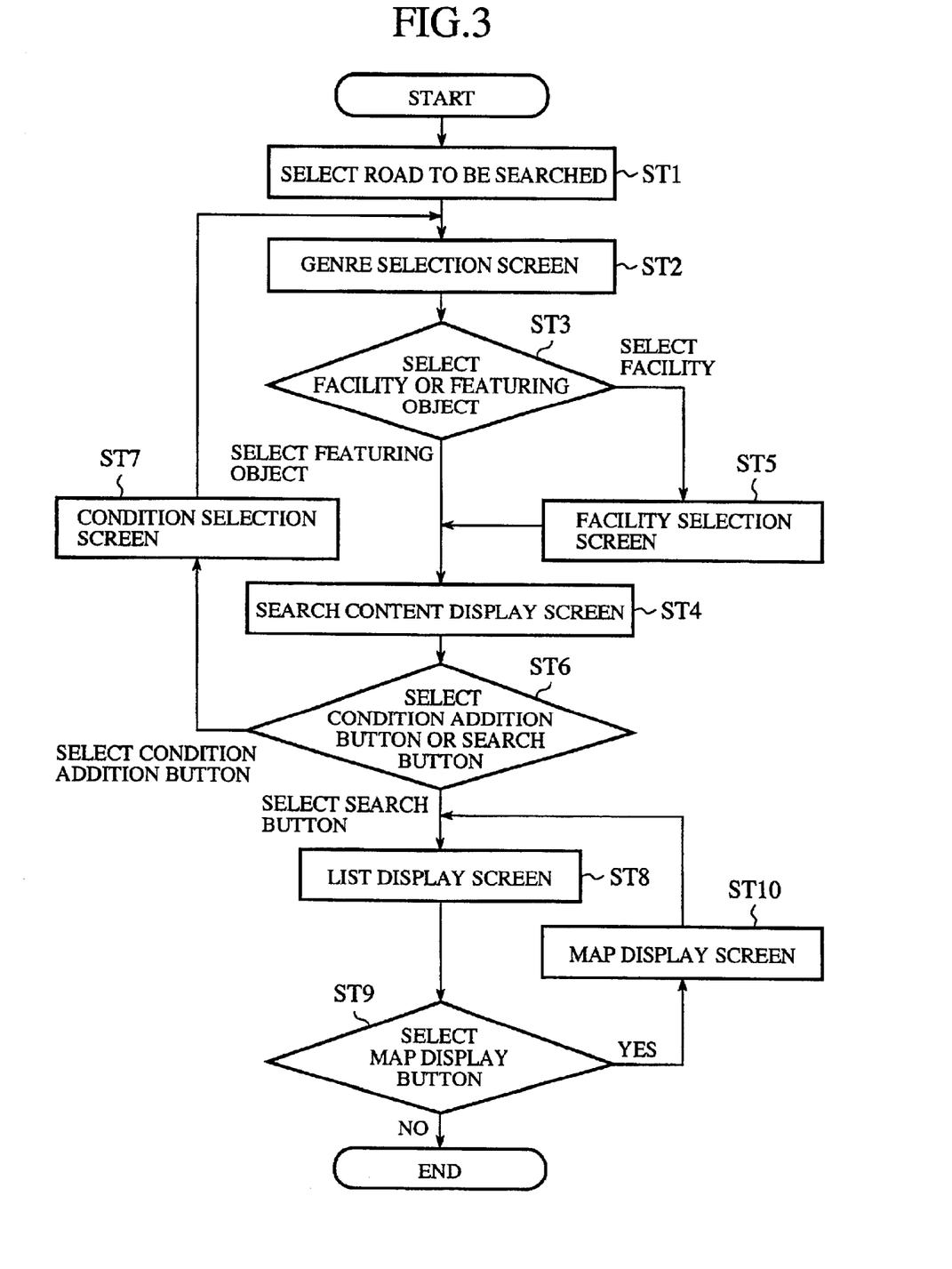
FIG. 3 is a flowchart to show the operation of the control device in the intersection search apparatus of the embodiment 1 in accordance with the present invention.
Figure 4:
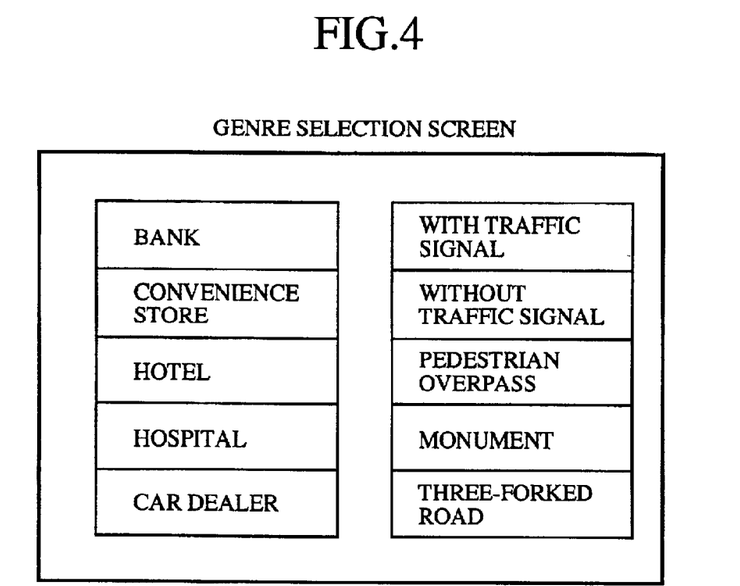
FIG. 4 is an illustration to show a genre selecting screen in the intersection search apparatus of the embodiment 1 in accordance with the present invention.
Figure 5:
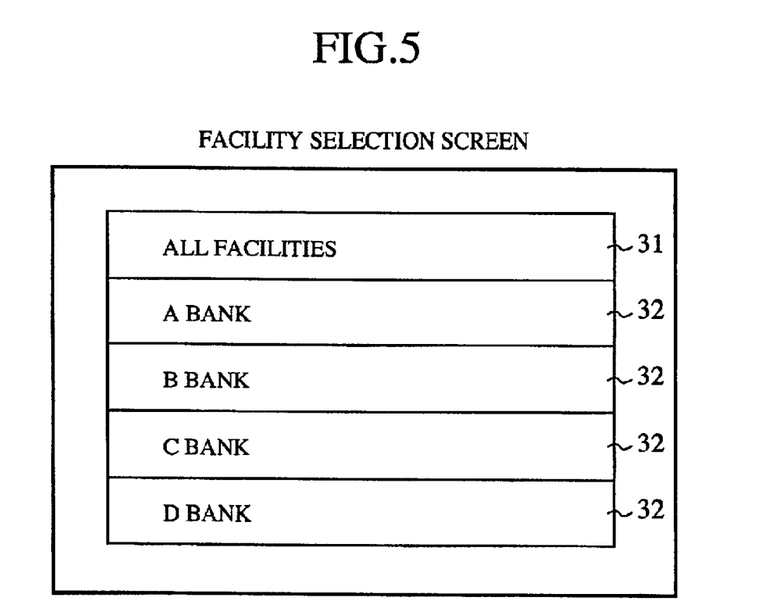
FIG. 5 is an illustration to show a facility selecting screen in the intersection search apparatus of the embodiment 1 in accordance with the present invention.

Next, the operation of the intersection search apparatus will be described. FIG. 3 is a flowchart to show an operation of the control device 1 in the intersection search apparatus. In the intersection search apparatus, first of all, a road to be searched is selected by a user (step ST1). In this case, for example, it is assumed that a road A is selected as the road to be searched. As a result, the control device 1 outputs a genre selecting screen shown in FIG. 4 (step ST2). The data for displaying this genre selecting screen is stored in the memory 5 and the genre includes facilities such as "bank", "convenience store", "hotel", "hospital", "car dealer" and the like and featuring objects such as "with traffic signal", "without traffic signal", "pedestrian overpass", "monument", "three-forked road" and the like. These facilities and/or featuring objects are those adjacent to the intersection or those adjacent to the intersection within a predetermined distance from the intersection. The user selects a desired genre on the genre selecting screen via the touch panel device 7. The intersection search unit 11 of the control device 1 judges the genre selected by the user (step ST3) and displays, for example, a facility selecting screen according to the genre selected by the user; for example, when the facility of "bank" is selected by the user, as shown in FIG. 5, the intersection search unit 11 displays the facility selecting screen for output the "facility name selection button" 32 for selecting a specific bank name and "all facility names selection button" 31 for selecting all the bank names (step ST5). The data displayed on the facility selecting screen is stored in the memory 5 for the respective facilities such as "bank", "convenience store", "hotel", "hospital", "car dealer" and the like. When the user operates the "facility name selection button" 32 for the facility selecting screen, the facility of the selected bank name is an object to be specified and when the user operates the "all facility names selection button" 31, the facilities of all the bank names are the objects to be searched.

Figure 6:
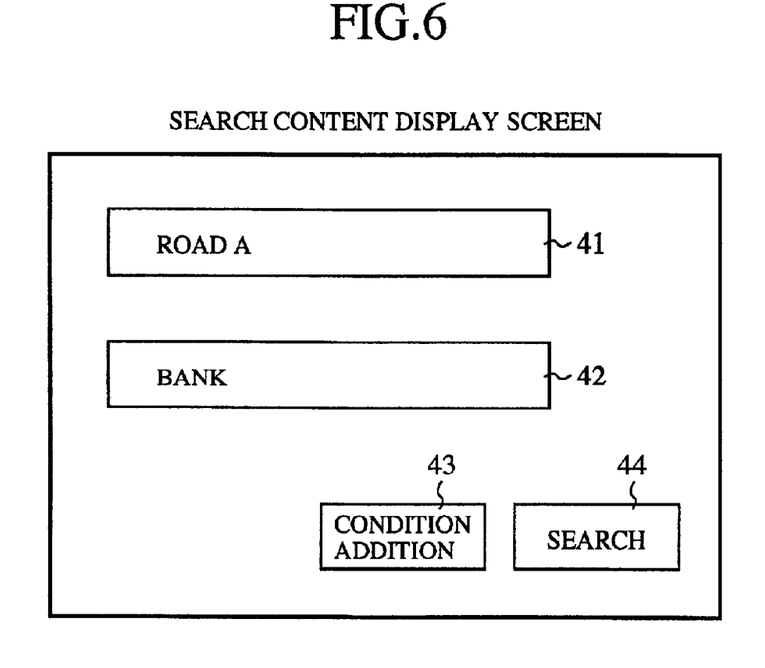
FIG. 6 is an illustration to show a search content display screen in the intersection search apparatus of the embodiment 1 in accordance with the present invention.

FIG. 6 is a search content display screen in which the road A selected in the step ST1 and the facility or the featuring object selected by the user in the step ST3 or in the step ST5 are displayed (step ST4). In the example of the search content display screen shown in FIG. 6, there is shown a case where the user selects the facility of "bank" for the genre selecting screen in the step ST3 and operates the "all facility names selection button" 31 for the facility selecting screen in the step ST5. A "condition addition button" 43 in the search content display screen shown in FIG. 6 is the button used to specify a plurality of facilities or featuring objects and a "search button" 44 is the button used for starting a search for objective facility or featuring object.

Figure 7:
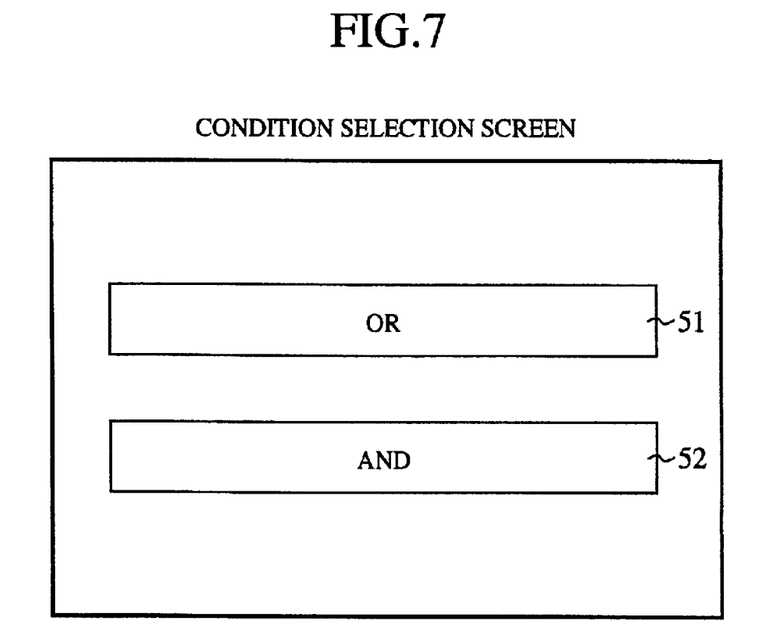
FIG. 7 is an illustration to show a condition selecting screen in the intersection search apparatus of the embodiment 1 in accordance with the present invention.

In the search content display screen shown in FIG. 6, when the user operates the "condition addition button" 43 (step ST6), the condition selecting screen shown in FIG. 7 is displayed (step ST7). This condition selecting screen is the screen in which the user selects an OR condition or an AND condition when the user specifies a plurality of facilities or featuring objects by the use of the "condition addition button" 43 and in which an "OR condition button" 51 and an "AND condition button" 52 are displayed. The user operates the "OR condition button" 51 or the "AND condition button" 52 for the condition selecting screen. In this case, when the user selects the "AND condition button" 52, the processes of the step ST2, the step ST3, the step ST5 (the step ST5 is repeated only when the facility is selected in the step ST3), and step ST4 are repeated again. It is assumed that the user selects, for example, the featuring object of "pedestrian overpass" in the step ST3 for the genre selecting screen displayed in the step ST2 in this repeated processing. As a result, there is displayed the screen shown in FIG. 8 in which the featuring object of "pedestrian overpass" that the user selects in the step ST3 in the repeated processing and the AND condition that the user selects by the "AND condition button" 52 in the step ST6 are added to the search content display screen in FIG. 6 (repeated step ST4). Since the "condition addition button" 65 and a "search button" 66 which are similar to the search content display screen shown in FIG. 6 are displayed in the screen shown in FIG. 8, when the user adds a facility or a featuring object to the condition, the user operates the "condition addition button" 65 to repeat a processing proceeding to a step ST7, the step ST2, the step ST3 and the step ST4, or a processing proceeding to the step ST7, the step St2, the step ST3, the step ST5 and the step St4.

Figure 8:
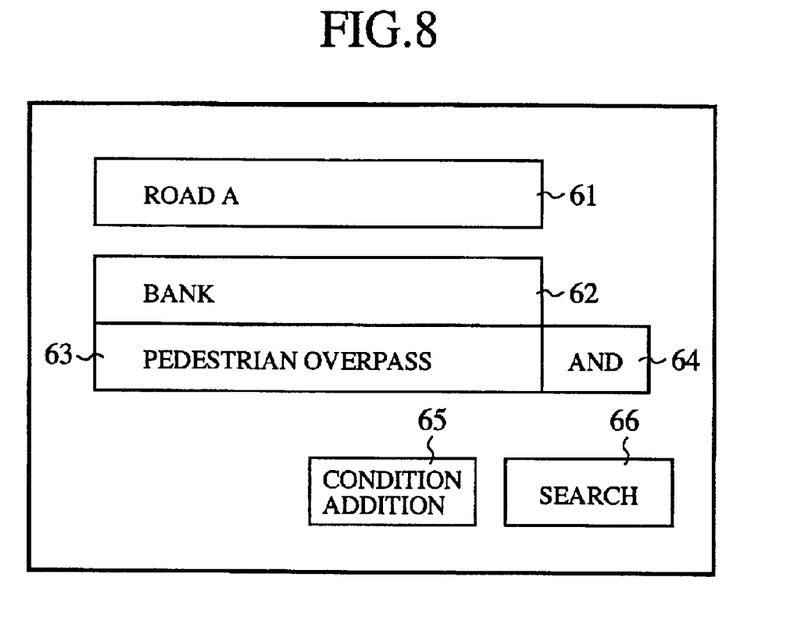
FIG. 8 is an illustration to show the search content display screen to which a featuring object selected by a user and an AND condition are added in the intersection search apparatus of the embodiment 1 in accordance with the present invention.
Figure 9:
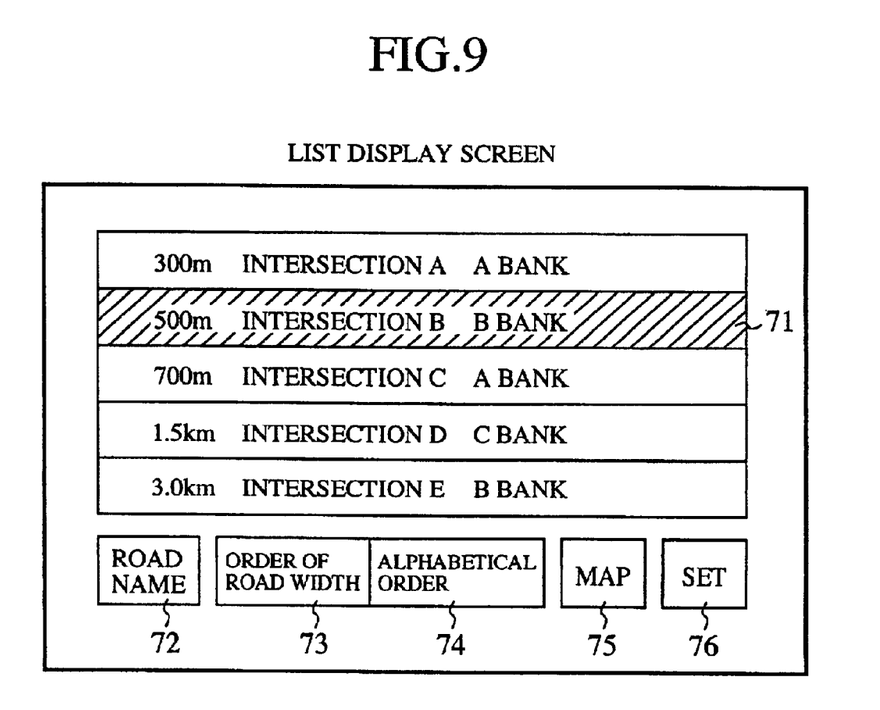
FIG. 9 is an illustration to show a list display screen in the intersection search apparatus of the embodiment 1 in accordance with the present invention.

Next, when the user operates the "search button" 66 displayed on the screen shown in FIG. 8 (step ST6), the intersection which has the bank name selected by the user out of all the facilities of "banks" for the facility selecting screen in the step ST5 and to which the featuring object of "pedestrian overpass" selected by the user for the genre selecting screen in the repeated step ST3 is adjacent, is searched from the intersections related to the road A to be searched, that is, the intersection which meets the AND condition selected by the "AND condition button" 52 on the genre selecting screen in the step ST7 (the AND condition that both of the bank name for the facility of "bank" and the featuring object of "pedestrian overpass" coexist) is searched from the intersections related to the road A to be searched, and the searched intersection is output on a list display screen shown in FIG. 9 (step ST8). As to the intersection information displayed in this list, the intersection meeting the above mentioned AND condition is searched from the information related intersection previously set for each intersection and it is output. The intersection related information previously set for each intersection includes groups of attributes for respective intersections such as the name of road having intersection, the name of intersection, the names of facility and featuring object adjacent to the intersection, and is previously stored in the recording medium 3 or the memory 5 as the map information.

Incidentally, on this list display screen, a list of "distance", "intersection name", and "bank name" for all the facilities of "banks" selected by the user in the step ST5 is sorted and displayed in order in which as intersections are nearer in beeline distance from the present position of the vehicle, they are arranged at the positions nearer to the top of the list, on the basis of present position of the vehicle, which is given by the position detecting unit (not shown) by the navigation apparatus. On the list display screen are displayed "a road name button" 72, "an order-of-road-width button" 73, "an alphabetical order button" 74, and "a map button" 75.

When the user operates the "road name button" 72 for the list display screen, in place of the intersection name having been displayed on the list display screen, intersection information of the names of roads crossing the road A to be searched at the respective intersections are displayed. Further, when the user operates the "order-of-road-width button" 73, the intersection information of the "road name", "distance" and "bank name" is sorted and displayed in order of the width of the road crossing the road A to be searched at the respective intersections. Further, when the user operates the "alphabetical order button" 74, the intersection information of the "intersection name" or the "road name" is displayed in the alphabetical order.

Figure 10:
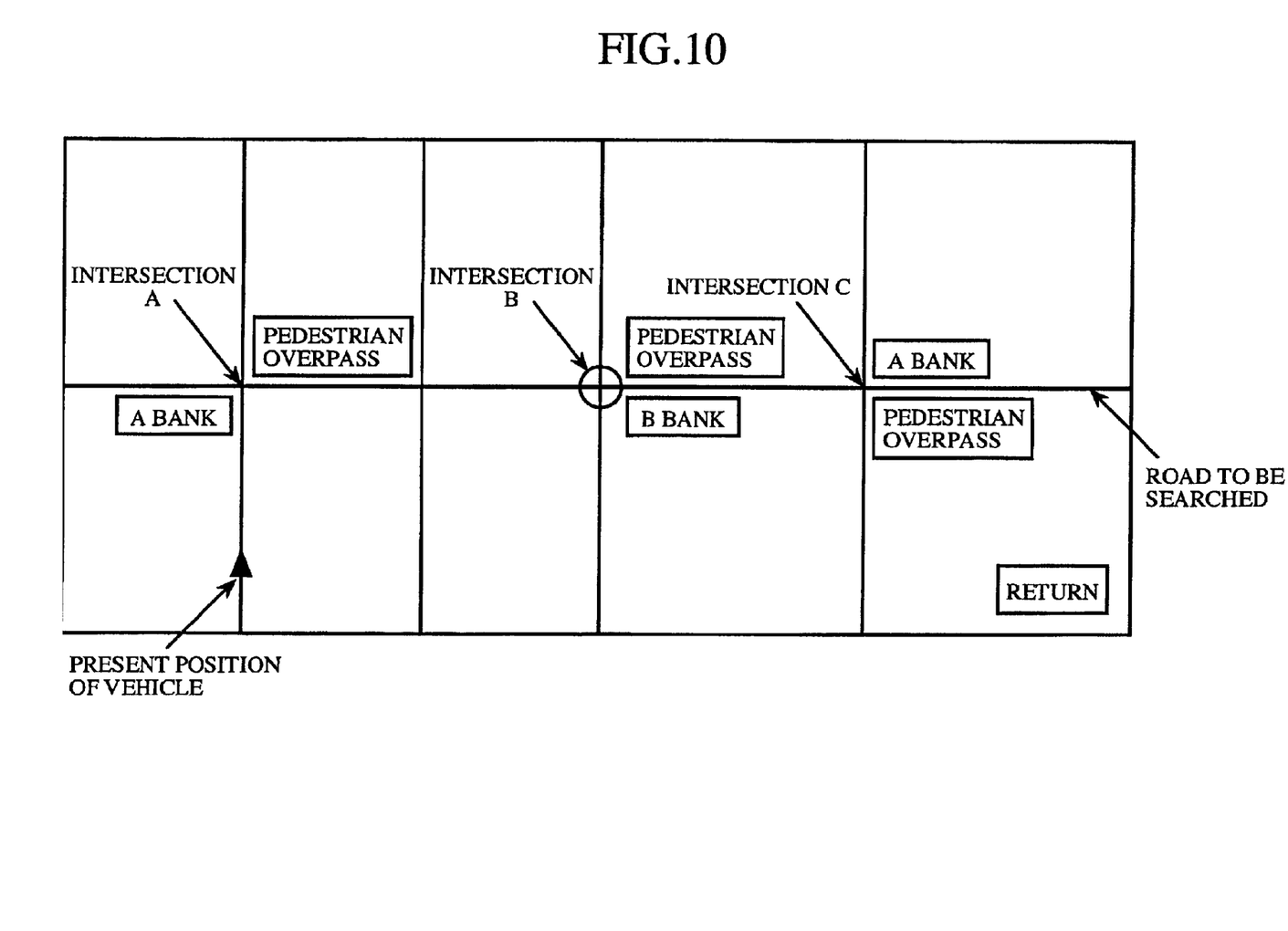
FIG. 10 is an illustration to show a map screen in which an intersection selected by the user is arranged in the center of the map screen in the intersection search apparatus of the embodiment 1 in accordance with the present invention.

Next, when the user selects one intersection denoted by a symbol 71 from the list display on the list display screen and operates the "map button" 75, the intersection information of the above mentioned intersection including the intersection related information such as the facility and/or the featuring object adjacent to the intersection is displayed by a map screen shown in FIG. 10 in which the intersection selected by the user is arranged in the center of the map screen. In this case, the map screen can be changed in scale or scrolled by the selecting operation of the user. Further, the intersection information is output in the form to be visually or audibly recognized by means of the display device 6 or the voice output device 8. Further, the selected intersection and the specified facility or featuring object adjacent to the selected intersection can be displayed with their symbols changed in color or shape or flickered, whereby the selected intersection and the specified facility or featuring object can be emphatically displayed on the map screen.

Further, it is also possible to set the selected intersection at any one of a departure place, a destination, a place on the route, and a registered place.

Incidentally, as the intersection information it may be constituted by the kind (for example, a national road or a municipal road), the name and the position of the intersection; the number, the kind, the name, the direction, the destination, the width, and the number of lanes of a road crossing the intersection; the numbers, the kinds, the names, the positions and the distances from the intersection of the facilities or the featuring objects adjacent to the intersection; traffic regulation information related to the intersection; a beeline distance, a route distance and a travel time from a predetermined place to the intersection. In the case where the intersection information is constituted in this manner, it is possible to display a list of intersection sorted in order of priority for the attributes of the intersection information such as in the order of the distance or the travel time from the predetermined place to the intersection, or the like on the list display screen in the step ST8.

As described above, according to the present embodiment 1, it is possible to produce an effect that the user can easily search an objective intersection if the user knows only the main facility or featuring object near the objective intersection even when the user does not know the name of the road crossing the road to be searched and the name of the intersection. Incidentally, while the navigation apparatus mounted on the vehicle has been described as an example in the above embodiment 1, the present invention can be applied similarly also to a cellular phone having a navigation function.

What is claimed is:

1. An intersection search apparatus, comprising:
   a map information retrieve unit to retrieve map information;
   an input unit to specify a road to be searched and intersection related information from roads and intersection related information included in the map information, wherein the intersection related information being selected from at least one of a facility and a featuring object;
   an intersection search unit to search for an intersection, regardless of present position of a vehicle, without using intersecting street name as an input, which exists on said road to be searched and specified by said input unit and to which said at least one of said facility and said featuring object, of said specified intersection related information is adjacent; and
   an output unit to output the intersection information related to said intersection searched by said intersection search unit.

2. The intersection search apparatus as claimed in claim 1, wherein said input unit specifies and selects from a combination of a plurality of facilities and featuring objects.

3. The intersection search apparatus as claimed in claim 1, wherein said intersection search unit searches for an intersection along the road specified by said input unit and to which the at least one of the facility and the featuring object specified and selected by said input unit is adjacent within a predetermined distance.

4. The intersection search apparatus as claimed in claim 1, wherein said intersection information includes any one of or any combination of: the kind, the name and the position of said intersection; the number, the kinds, the name, the directions, the destination, the widths, and the number of lanes of road crossing said intersection; the numbers, the names, the positions, and the distances from the intersection of the facilities or the featuring objects adjacent to said intersection; traffic regulation information related to said intersection; a beeline distance, a route distance and a travel time from a predetermined place to said intersection.

5. The intersection search apparatus as claimed in claim 1, wherein said output unit outputs said intersection information in a form to be visually or audibly recognized.

6. The intersection search apparatus as claimed in claim 1, wherein said output unit displays a list of intersection information related to at least one intersection.

7. The intersection search apparatus as claimed in claim 6, wherein said output unit displays said list of intersection information sorted in order of priority when it outputs said intersection information with its respective attributes.

8. The intersection search apparatus as claimed in claim 7, wherein said output unit displays said list of intersection information sorted in order of: the initial letter of the name of said intersection or a crossing road; the width of the crossing road; or a distance or a travel time from a predetermined place to said intersection.

9. The intersection search apparatus as claimed in claim 6, wherein said output unit outputs said intersection information selected from the intersection information displayed in said list.

10. The intersection search apparatus as claimed in claim 9, wherein said output unit emphatically displays said selected intersection and the specified facility or featuring object on a map by means that said selected intersection and the specified facility or featuring object adjacent to said selected intersection are displayed with their symbols different in color or shape or flickered.

11. An intersection search method, comprising:

retrieving map information;

specifying a road to be searched and intersection-related information from roads and intersection related information included in the map information, wherein the intersection related information being selected from at least one of a facility and a featuring object;

searching for an intersection, regardless of present position of a vehicle, without using intersecting street name as an input, which exists on said specified road to be searched to which the at least one of the facility and the featuring object of said specified and selected intersection-related information is adjacent from said map information; and outputting said intersection information related to said intersection searched by said searching.

* * * * *